United States Patent [19]

Yagley

[11] Patent Number: 4,574,758

[45] Date of Patent: Mar. 11, 1986

[54] INDIVIDUAL CYLINDER SPARK DERATION

[75] Inventor: Martin G. Yagley, Sterling Heights, Mich.

[73] Assignee: Chrysler Corporation, Highland Park, Mich.

[21] Appl. No.: 626,184

[22] Filed: Jun. 29, 1984

[51] Int. Cl.⁴ .............................................. F02P 5/04
[52] U.S. Cl. ..................................... 123/425; 123/435
[58] Field of Search ................................. 123/425, 435

[56] References Cited

U.S. PATENT DOCUMENTS

| | | | |
|---|---|---|---|
| 4,243,007 | 1/1981 | Ehrhardt | 123/425 |
| 4,282,841 | 8/1981 | Takagi | 123/425 |
| 4,331,117 | 5/1982 | Ginsburgh | 123/425 |
| 4,354,378 | 10/1982 | Oshiage | 123/425 |
| 4,366,792 | 1/1983 | Deleris | 123/425 |
| 4,388,902 | 6/1983 | Latapie | 123/425 |
| 4,413,599 | 11/1983 | Shigematsu | 123/425 |
| 4,471,736 | 9/1984 | Yoshida | 123/425 |

Primary Examiner—Ronald B. Cox
Attorney, Agent, or Firm—Mark P. Calcaterra

[57] ABSTRACT

A system for providing individual engine cylinder spark deration in response to detonation.

2 Claims, 2 Drawing Figures

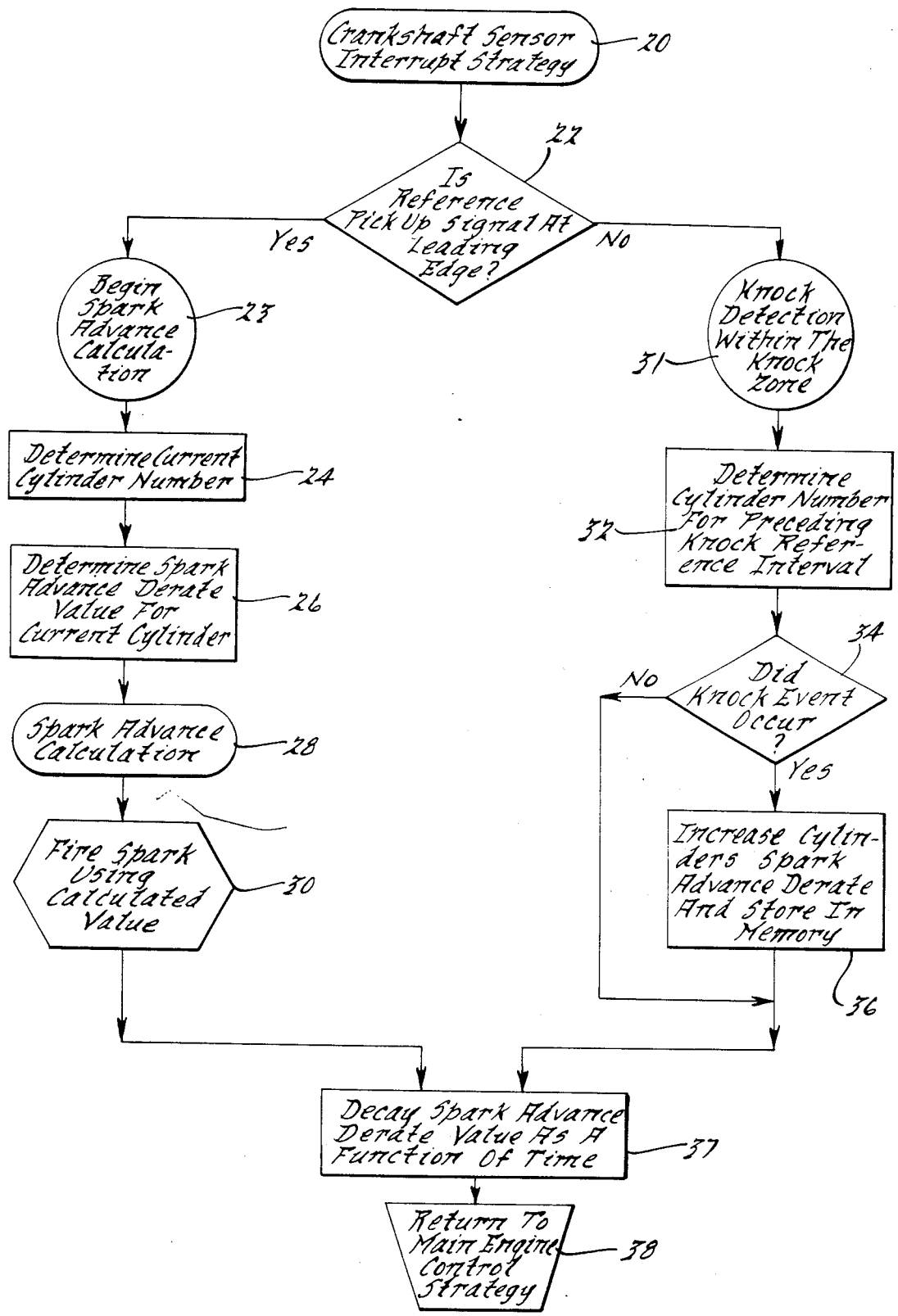

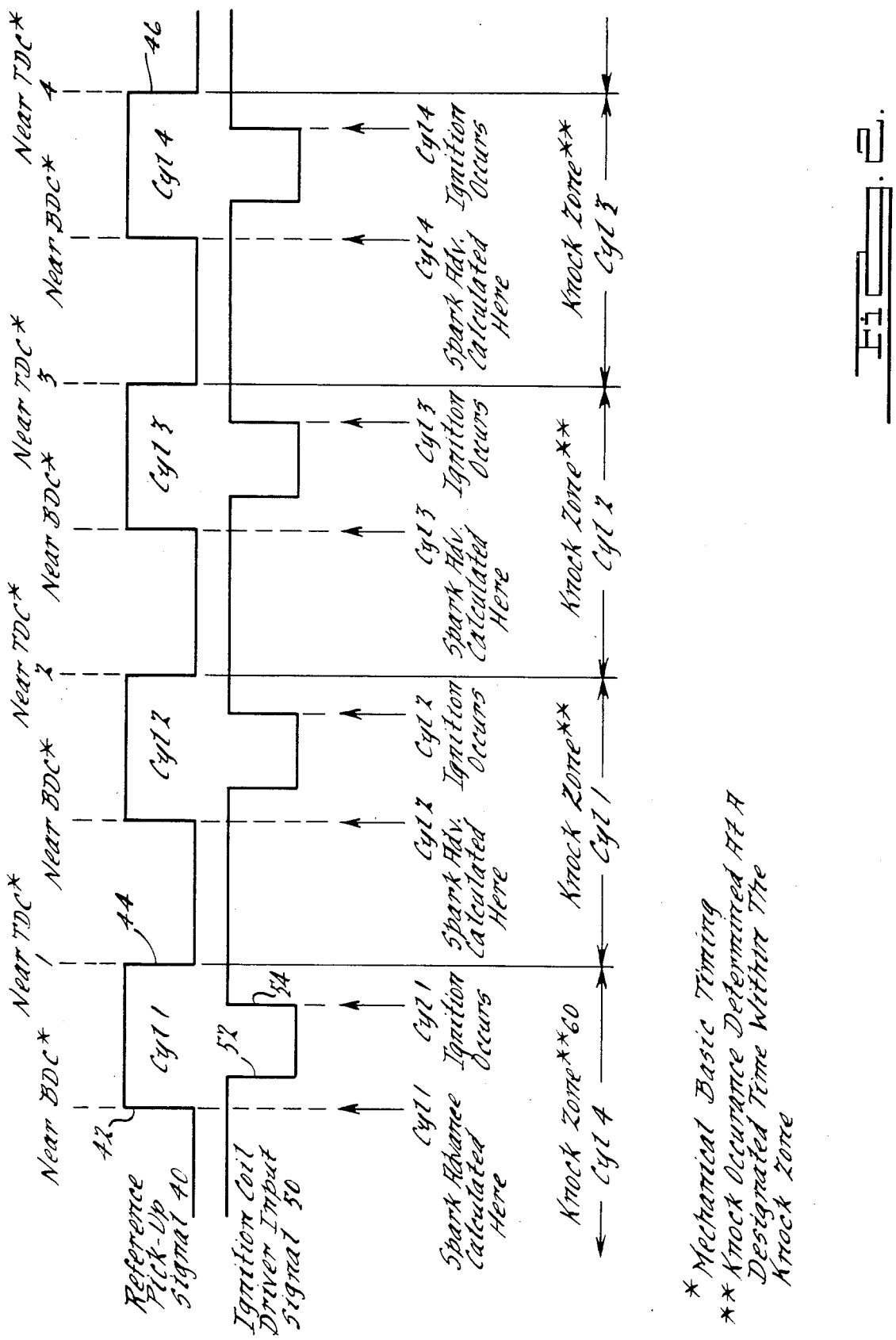

INDIVIDUAL CYLINDER SPARK DERATION

BACKGROUND AND SUMMARY OF THE INVENTION

Individual cylinder spark deration improves engine control computer knock routine control strategies. Previous systems measured knock or detonation of all the cylinders and averaged them over time. Any individual cylinder which was experiencing detonation had an influence as to whether the control system would derate the spark. However, the cylinders not experiencing detonation would also have an influence on the control system in the opposite manner. Strategies took all of the detonation information from each of the cylinders and treated it as an average to derate the spark, if necessary, for all of the cylinders.

In these routines, pressure is exerted against spark deration, by automatically decaying the spark advance derate value held in memory as a function of time. This forces the system to update its information to reevaluate detonation in an attempt to provide an accurate spark advance derate signal.

In the subject disclosure, the control strategy is changed to respond to the detonation which has occurred in an individual cylinder. The control strategy then determines how much spark deration should occur for each individual cylinder and fires the spark accordingly. Consequently, a more optimum spark advance is obtained so that the engine runs at a more precise knock-free ignition level.

Additional advantages by use of the subject strategy include the ability to operate the engine with lower octane fuels; the ability to correct knock in the cylinder of its source (typically one cylinder is the first to knock) which eliminates unnecessary performance and power derations which occur if all cylinders are derated in response to knock in one cylinder; and the tighter control of engine exhaust temperature which, if too high, can adversely affect component durability.

DESCRIPTION OF THE DRAWINGS

Other objects, features and advantages of the present invention will become more fully apparent from the following Detailed Description Of The Preferred Embodiment, the appended Claims and in the accompanying drawings in which:

FIG. 1 is a flowchart which illustrates the steps involved in the subject control strategy; and FIG. 2 is a timing chart illustrating the time relationship between ignition, spark advance calculation, spark firing, and the time zone in which detonation occurs.

DETAILED DESCRIPTION OF THE PREFERRED EMBODIMENT

Referring to FIG. 1, the control strategy is utilized at a predetermined time in the total control scheme for the engine and/or it is utilized on an interrupt basis in response to knock.

The transducer or pick-up employed herein is a crankshaft position sensor or distributor position sensor which is utilized to identify the position of the cylinders by telling you the position of the crankshaft. The pick-up output gives information to the computer control system which identifies the fact that one of the cylinders has its piston near the top dead center (TDC) or near the bottom dead center (BDC)(mechanical basic timing) position. Once the crankshaft sensor interrupt routine in bubble 20 is entered, a decision must be made in block 22 based on the pick-up signal's condition.

Block 22 of this strategy looks to the pick-up signal output to find out whether the pick-up signal is at its leading or trailing edge. If the pick-up signal is at its leading edge (the piston is near BDC), the control strategy branches to block 23 to begin to make a spark advance calculation based on Manifold Absolute Pressure (MAP), engine RPM, engine coolant temperature, barometric pressure, etc. Next, the current cylinder number is determined in block 24. In block 26 the spark advance deration value for the corresponding current cylinder number is then retrieved from a memory location. The spark advance calculation is then made in bubble 28 based on a predetermined and stored relationship. The spark advance calculation is then used to fire the spark in block 30 and the control system returns to perform other tasks via block 38.

Returning now to decision block 22, if the pick-up signal is not on its leading edge (piston is near TDC), the control strategy proceeds to bubble 31 to detect knock at a designated time within the knock zone.

The strategy proceeds through block 32 to determine the cylinder number for the preceding knock zone.

The strategy then proceeds the decision block 34 at which time the control system will receive a signal from a knock sensor alone or in combination with other transducers and decide whether a knock event has occurred from the preceding cylinder. This is performed by a mechanism which can sense and remember the knock event data. The data so acted on is, therefore, not necessarily real time.

If no such knock event has occurred, the control strategy proceeds toward block 38 via bubble 37 without making any alteration to the stored spark advance deration value other than a predetermined pressure (decay as a function of time) on this variable to force reevaluation of the detonation event.

At this point, the spark advance value which has been previously stored in memory and which has been affected by the downward pressure to zero, can be utilized by the routine when next it captures the deration value in block 26.

Returning now to decision block 34, if a knock event did occur, the control strategy proceeds through block 36 and increases the spark advance deration value for that cylinder and stores the new value in memory.

Once this increase has been made to spark advance deration value for an individual cylinder, the control system proceeds to block 38 via block 37 to await its next task which typically will be to fire the fuel injector.

Referring now to FIG. 2, a timing chart is illustrated showing the output signal from the crankshaft transducer or pick-up as wave form 40. The signal is repetitive and its period is a function of the number of cylinders in the power plant. The wave form illustrated in FIG. 2 is that for a four cylinder engine. The leading edge (near BDC) of the pick-up signal 42 occurs approximately at 166° before top dead center (BTDC). The trailing edge 44 of the pick-up output occurs when the piston is approximately at the top dead center position of the cylinder (TDC). The signal is essentially the same for all four cylinders. In FIG. 2, the order of numbering of each cylinder's pulse is illustrative and will be a function of the firing order of the cylinders and/or the labelling assigned to each cylinder by the control system. In the preferred embodiment described herein, the leading edge 42 controls the spark advance decisions and calculations and the trailing edge 44 controls the fuel decisions.

Also illustrated in FIG. 2 is the signal from the control computer to the ignition coil driver 50. The ignition coil driver input signal 50 drives the coil to fire the spark after a predetermined time 52. The ignition occurrence is at edge 54 of the ignition coil driver input signal 50 and is based on spark advance calculations and derations made in the control system beginning at edge 42 of pick-up signal 40.

In the preferred embodiment, a knock zone has been defined and is shown as 60 in FIG. 2. The period of the knock zone is approximately the same for all four cylinders, but the identification of each knock zone lags the current cylinder's ignition by one cylinder in the firing order. Thus, for example, the knock zone for cylinder 4 shown as 60 in FIG. 2 exists during the period of the pick-up signal for cylinder 1 which begins with the trailing edge 46 from cylinder 4 to the trailing edge 44 for cylinder 1.

The assumption has been made that knock, if it occurs, will do so in the knock zones as described herein. Therefore, at or before the trailing edge of each pick-up signal (trailing edge 44 for cylinder 1), the occurrence of knock is monitored. This decision affects the next calculation, deration and ignition for cylinder 4.

The individual cylinder retard system assumes that the manifestation of detonation in a particular cylinder occurs after the piston has passed the TDC position. Furthermore, it assumes that such manifestations will conclude prior to when the succeeding cylinder's piston reaches TDC. This defines the knock zone for a particular cylinder. Other knock zone definitions are possible.

The cylinder numbering in FIG. 2 can be arbitrarily assigned by the control system or precisely determined by using a separate pickup.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

I claim:

1. In a spark ignited internal combustion engine, means responsive to the occurrence of engine knock comprising:

means for sensing engine knock and converting same into a corresponding electrical knock signal;

means for sensing engine speed and converting same into a corresponding electrical pulsed signal with leading and trailing edges for each pulse;

storage means for storing a spark advance derate value for each cylinder and for storing a predetermined spark advance relationship;

comparing means to discriminate between the leading and trailing edges of the pulses;

means to determine the current cylinder number and the preceding cylinder number in the firing order;

means to calculate spark advance according to the predetermined spark advance relationship for each cylinder utilizing the corresponding spark derate value if the pulse is at the leading edge;

means for firing the spark to the corresponding cylinder using the calculated spark advance value;

means for defining a knock zone for each cylinder;

means for detecting the presence of a knock signal within the knock zone;

means for deciding whether a knock signal was present within the knock zone for the preceding cylinder number; and means for increasing the spark advance derate value for the preceding cylinder and updating the stored value for the corresponding cylinder if the knock signal was present during the knock zone;

the means responsive to the occurrence of engine knock further comprising means to decay a cylinder's stored spark advance derate value as a function of time.

2. In a spark ignited internal combustion engine with a computer control system, a method responsive to the occurrence of engine knock comprising:

sensing engine knock and converting same into a corresponding electrical knock signal;

sensing engine speed and converting same into a corresponding electrical pulsed signal with leading and trailing edges for each pulse;

storing a spark advance derate value for each cylinder and for storing a predetermined spark advance relationship;

comparing the leading and trailing edges of the pulses;

determining the current cylinder number and the preceding cylinder number in the firing order;

calculating spark advance according to the predetermined spark advance relationship for each cylinder utilizing the corresponding spark derate value if the pulse is at the leading edge;

firing the spark to the corresponding cylinder using the calculated spark advance value;

defining a knock zone for each cylinder;

detecting the presence of a knock signal within the knock zone;

deciding whether a knock signal was present within the knock zone for the preceding cylinder number; and increasing the spark advance derate value for the preceding cylinder and updating the stored value for the corresponding cylinder if the knock signal was present during the knock zone;

the method responsive to the occurrence of engine knock further comprising decaying a cylinder's stored spark advance derate value as a function of time.

* * * * *